(12) United States Patent
Xu et al.

(10) Patent No.: US 12,524,133 B2
(45) Date of Patent: *Jan. 13, 2026

(54) TEMPLATE SELECTION METHOD, ELECTRONIC DEVICE AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventors: Feng Xu, Beijing (CN); Yifan Wu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,800

(22) Filed: Mar. 19, 2024

(65) Prior Publication Data

US 2024/0220081 A1 Jul. 4, 2024

Related U.S. Application Data

(63) Continuation of application No. 17/826,409, filed on May 27, 2022, now Pat. No. 11,960,703.

(30) Foreign Application Priority Data

Jan. 14, 2022 (CN) .......................... 202210044686.9

(51) Int. Cl.
*G06F 3/0482* (2013.01)
*G11B 27/031* (2006.01)

(52) U.S. Cl.
CPC .......... *G06F 3/0482* (2013.01); *G11B 27/031* (2013.01)

(58) Field of Classification Search
CPC ............... G06F 3/0482; G06F 3/04845; G06F 16/7335; G06F 16/71; G06F 16/735;
(Continued)

(56) References Cited

U.S. PATENT DOCUMENTS

| 11,960,703 B2 | 4/2024 | Xu et al. |
| 2007/0064121 A1 | 3/2007 | Issa et al. |

(Continued)

FOREIGN PATENT DOCUMENTS

| CN | 104346202 A | 2/2015 |
| CN | 109002387 A | 12/2018 |

(Continued)

OTHER PUBLICATIONS

Office action received from Korean patent application No. 10-2024-7024606 mailed on Sep. 16, 2024, 19 pages (10 pages English Translation and 9 pages Original Copy).

(Continued)

*Primary Examiner* — Cao H Nguyen

(57) ABSTRACT

In this application, there are disclosed a template selection method, an electronic device, and a non-transitory computer-readable storage medium. The template selection method includes: presenting a video browsing interface in response to a request of a user, wherein the video browsing interface includes a shooting button; presenting a dynamic picture within an area of the shooting button in response to determining that a specified preset condition is met, wherein the dynamic picture is associated with a software package; and in response to a selection instruction of the user on the dynamic picture presented within the area of the shooting button, loading the software package, wherein the software package is configured to generate multimedia content at least based on a multimedia content editing template.

20 Claims, 7 Drawing Sheets

(58) Field of Classification Search
CPC . G06F 16/743; G06F 3/04842; G11B 27/031; G11B 27/34
See application file for complete search history.

(56) References Cited

U.S. PATENT DOCUMENTS

| | | |
|---|---|---|
| 2012/0011747 A1 | 1/2012 | Borel et al. |
| 2012/0117473 A1* | 5/2012 | Han .................. H04N 1/00148 715/723 |
| 2017/0168697 A1 | 6/2017 | Shpalter et al. |
| 2018/0330756 A1 | 11/2018 | Macdonald |
| 2020/0053288 A1 | 2/2020 | Kim et al. |
| 2020/0358963 A1 | 11/2020 | Manzari et al. |
| 2021/0005223 A1* | 1/2021 | Wang .................... G06F 3/0482 |
| 2021/0264952 A1 | 8/2021 | Zhu et al. |
| 2021/0312948 A1* | 10/2021 | Haley ................ H04N 21/2743 |
| 2022/0005508 A1 | 1/2022 | Huang |
| 2022/0238139 A1* | 7/2022 | Zheng ................ H04N 21/472 |
| 2022/0321795 A1 | 10/2022 | Jiang et al. |
| 2022/0394191 A1* | 12/2022 | Wang .................... H04N 23/64 |
| 2023/0097683 A1 | 3/2023 | Liu |
| 2023/0127671 A1* | 4/2023 | Zhang .................... H04N 23/64 348/207.1 |
| 2023/0128746 A1 | 4/2023 | He et al. |
| 2023/0195285 A1 | 6/2023 | Feng et al. |
| 2024/0129620 A1 | 4/2024 | Wang et al. |

FOREIGN PATENT DOCUMENTS

| | | |
|---|---|---|
| CN | 110177219 A | 8/2019 |
| CN | 110401766 A | 11/2019 |
| CN | 110536177 A | 12/2019 |
| CN | 110913135 A | 3/2020 |
| CN | 111328387 A | 6/2020 |
| CN | 111930994 A | 11/2020 |
| CN | 111935402 A | 11/2020 |
| CN | 112087652 A | 12/2020 |
| CN | 112135059 A | 12/2020 |
| CN | 112291484 A | 1/2021 |
| CN | 112732977 A | 4/2021 |
| CN | 112738623 A | 4/2021 |
| CN | 113050857 A | 6/2021 |
| CN | 113115099 A | 7/2021 |
| CN | 113778285 A | 12/2021 |
| CN | 114528433 A | 5/2022 |
| EP | 4090005 A1 | 11/2022 |
| JP | 2004-134979 A | 4/2004 |
| KR | 2017-0062932 A | 6/2017 |
| KR | 2021-0103742 A | 8/2021 |
| WO | 2021/249494 A1 | 12/2021 |
| WO | 2022042674 A1 | 3/2022 |
| WO | 2022048435 A1 | 3/2022 |
| WO | 2022/252660 A1 | 12/2022 |

OTHER PUBLICATIONS

International Search Report and Written Opinion for International Application No. PCT/CN2023/071259, mailed May 11, 2023, 11 Pages.
Extended EP Search Report issued in EP Appl. No. 23739959.7 mailed Mar. 11, 2025, 10 pages.
Notice of Refusal issued in JP Appl. No. 2024-541959 mailed Feb. 3, 2025, English translation, 6 pages.
Communication pursuant to Rules 70(2) and 70a(2) EPC for European Application No. 23739959.7, mailed Mar. 28, 2025, 1 page.
Invitation to Respond to Written Opinion for Singaporean Application No. 11202404765T dated Apr. 10, 2025, 9 pages.
Request for the Submission of an Opinion for Korean Application No. 10-2024-7024606, mailed Feb. 13, 2025, 8 pages.
Technical Examination Report for Brazilian Application No. BR112024014254-0, mailed Apr. 8, 2025, 12 pages.

* cited by examiner

TEMPLATE SELECTION METHOD, ELECTRONIC DEVICE AND NON-TRANSITORY COMPUTER-READABLE STORAGE MEDIUM

CROSS-REFERENCE TO RELATED APPLICATIONS

The present disclosure is a continuation application of a U.S. application Ser. No. 17/826,409, which is based on and claims priority of Chinese application for invention No. 202210044686.9, filed on Jan. 14, 2022. The disclosure of the U.S. application Ser. No. 17/723,881 and the Chinese application No. 202210044686.9 are hereby incorporated into this disclosure by reference in its entirety.

TECHNICAL FIELD

Embodiments of the present disclosure relate to the technical field of data processing, and particularly to a template selection method, an electronic device, and a non-transitory computer-readable storage medium.

BACKGROUND

A short video, namely a video clip, is an Internet content distribution manner, and is generally a video with a duration within several minutes that is distributed on Internet new media, and can be made by a user through video playing software, to record and share life.

However, making the short video based on the video playing software usually requires advanced video processing knowledge and takes a lot of time, and although the video can be rapidly generated based on a template at present, due to a wide variety of templates, the user needs to screen out a template required by himself from the wide variety of templates according to short video making requirements, and this manner of screening by the user himself often takes up excessive time of the user, so that the user experience effect is reduced.

SUMMARY

According to the embodiments of the present disclosure, there are provided a template selection method, an electronic device and a non-transitory computer-readable storage medium, to present dynamic pictures of an software package within an area of a shooting button and recommend the software package through the dynamic pictures.

In a first aspect, the embodiments of the present disclosure provide a template selection method, comprising:
presenting a video browsing interface in response to a request of a user, wherein the video browsing interface comprises therein a shooting button;
presenting a dynamic picture within an area of the shooting button in response to determining that a specified preset condition is met, wherein the dynamic picture is associated with a software package; and
in response to a selection instruction of the user on the dynamic picture presented within the area of the shooting button, loading the software package,
wherein the software package is configured to generate multimedia content at least based on a multimedia content editing template.

In a second aspect, the embodiments of the present disclosure further provide an electronic device, comprising:
one or more processors; and
a memory configured to store one or more programs,
wherein the one or more programs, when executed by the one or more processors, cause the one or more processors to implement a template selection method, comprising,
presenting a video browsing interface in response to a request of a user, wherein the video browsing interface comprises a shooting button;
presenting a dynamic picture within an area of the shooting button in response to determining that a specified preset condition is met, wherein the dynamic picture is associated with a software package; and
in response to a selection instruction of the user on the dynamic picture presented within the area of the shooting button, loading the software package,
wherein the software package is configured to generate multimedia content at least based on a multimedia content editing template. In a third aspect, the embodiments of the present disclosure provide A non-transitory computer-readable storage medium having stored thereon a computer program, wherein the program, when executed by a processor, implements a template selection method, comprising,
presenting a video browsing interface in response to a request of a user, wherein the video browsing interface comprises a shooting button;
presenting a dynamic picture within an area of the shooting button in response to determining that a specified preset condition is met, wherein the dynamic picture is associated with a software package; and
in response to a selection instruction of the user on the dynamic picture presented within the area of the shooting button, loading the software package,
wherein the software package is configured to generate multimedia content at least based on a multimedia content editing template.

BRIEF DESCRIPTION OF THE DRAWINGS

The above and other features, advantages, and aspects of embodiments of the present disclosure will become more apparent in conjunction with the accompanying drawings and with reference to the following embodiments. Throughout the drawings, identical or similar reference numbers refer to identical or similar elements. It should be understood that the drawings are schematic and that components and elements are not necessarily drawn to scale.

DETAILED DESCRIPTION

Figure 1:
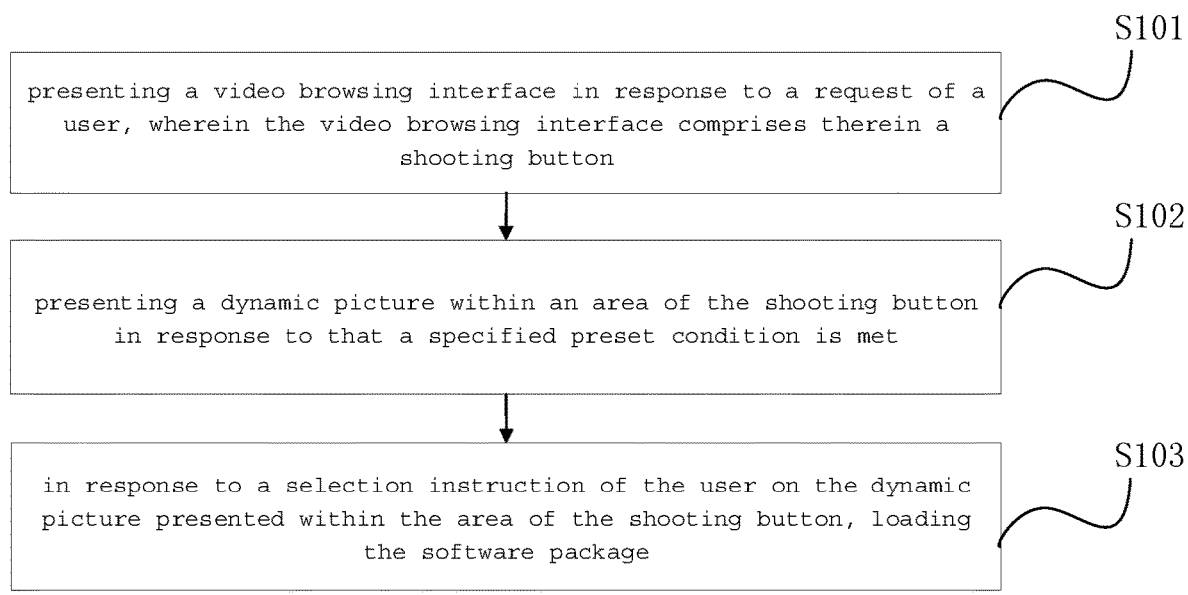
FIG. 1 is a flow diagram of a template selection method according to some embodiments of the present disclosure.

The embodiments of the present disclosure will be described in more detail below with reference to the accompanying drawings. While certain embodiments of the present disclosure are shown in the drawings, it should be understood that the present disclosure can be implemented in various forms and should not be construed as limited to the embodiments set forth herein. On the contrary, these embodiments are provided for a more complete and thorough understanding of the present disclosure. It should be understood that the drawings and the embodiments of the present disclosure are for exemplary purposes only and are not intended to limit the protection scope of the present disclosure.

It should be understood that various steps recited in method embodiments of the present disclosure can be performed in a different order, and/or performed in parallel. Moreover, the template selection method embodiments can comprise additional steps and/or omit performing the illustrated steps. The scope of the present disclosure is not limited in this respect.

A term "comprising" and variations thereof used herein are intended to be open-minded, i.e., "comprising but not limited to". A term "based on" is "based at least in part on". A term "one embodiment" means "at least one embodiment"; a term "another embodiment" means "at least one other embodiment"; and a term "some embodiments" means "at least some embodiments". Relevant definitions of other terms will be given in the following description.

It should be noted that notions of "first", "second", and the like that are mentioned in the present disclosure are only used for distinguishing different devices, modules or units, and are not used for limiting the order or interdependence of functions performed by the devices, modules or units.

It should be noted that modifications of "one" or "more" that are mentioned in the present disclosure are intended to be schematic rather than restrictive, and those skilled in the art should appreciate that they should be understood as "one or more" unless otherwise clearly indicated in the context.

Names of messages or information exchanged between a plurality of devices in some embodiments of the present disclosure are for illustrative purposes only, and are not intended to limit the scope of these messages or information.

FIG. 1 is a flow diagram of a template selection method provided in some embodiments of the present disclosure, and these embodiments can be adapted to recommend an software package to a user by presenting a dynamic picture within an area of a shooting button. The template selection method can be performed by a template selection apparatus provided in some embodiments of the present disclosure, which can be implemented by software and/or hardware, and can be generally integrated in a computer device. The template selection method in some embodiments of the present disclosure specifically comprises:

step S101, presenting a video browsing interface in response to a request of a user, wherein the video browsing interface comprises a shooting button.

Figure 2:
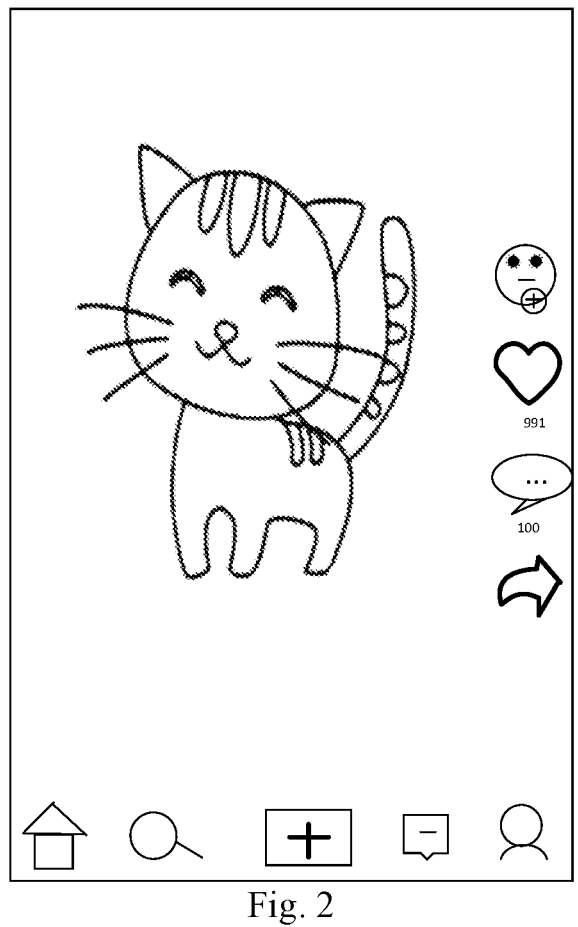
FIG. 2 is a schematic diagram of a video browsing interface comprising a shooting button according to some embodiments of the present disclosure.

In some embodiments, a short video application software APP is pre-installed on a terminal device, and in response to determining that receiving a request of the user for logging in the short video application software, the terminal device will present the video browsing interface in response to the request of the user, and the user can select a video of interest by performing a swipe operation on the video browsing interface. As shown in FIG. 2, there is shown a schematic diagram of the presented video browsing interface, where the video browsing interface comprises thereon a shooting button, as shown by a "+" identification in the figure, and the user can post a short video work on the short video application software by clicking on the shooting button.

It should be noted that, in some embodiments, the "+" identification is taken only as an example to explain the shooting button. In practical applications, however, a specific presentation form of the shooting button is not limited, and as long as the browsing and posting of the short video work can be achieved, it is within the protection scope of the present application, and is not limited in some embodiments.

Step S102, presenting a dynamic picture within an area of the shooting button in response to determining that a specified preset condition is met, wherein the dynamic picture is associated with a software package.

In some embodiments, the dynamic picture is a preview of the multimedia content editing template, and in some embodiments, the dynamic picture can specifically be a preview acquired according to thumbnail processing of the multimedia content editing template.

In some embodiments, the specified preset condition comprises: a browsing duration of the user for the video browsing interface reaching a preset duration; or a browsing content of the user on the video browsing interface comprising a video of a specified type; or an operation behavior of the user for the browsing content on the video browsing interface meeting a preset condition.

In some embodiments, in response to determining that the specified preset condition is met, the software package will be acquired, and the software package is subjected to the thumbnail processing to acquire the dynamic picture, so that the dynamic picture can specifically be the preview of the software package, and the specific area where the shooting button "+" is presented on the video browsing interface is determined, and the acquired dynamic picture is presented within the determined area.

In some embodiments, it should be noted that the specified preset condition can specifically be the browsing duration of the user on the video browsing interface reaching the preset duration, for example, exceeding 1 minute; or, the browsing content of the user on the video browsing interface comprising the video of the specified type, for example, viewing a video related to an animal; or the operation behavior of the user for the browsing content on the video browsing interface meeting the preset condition, for example, the user performing a like operation or a comment operation on the browsing content on the video browsing interface. Of course, the specified preset condition can also be preset by a server, for example, current time reaching a specified holiday, and the specific form of the specified preset condition is not limited in some embodiments, and in response to determining that the specified preset condition is met, the dynamic picture of the software package will be presented within the area of the shooting button.

A specific acquisition manner of the software package can be that it is acquired by a match according to the current browsing content of the user on the video browsing interface, or it is acquired according to a user attribute, and of course, it can also be preset by the server, for example, an software package related to a Christmas theme is preset on a day before Christmas, and is pushed by means of dynamic pictures. Of course, in some embodiments, examples are taken only for illustration and specific acquisition manners of the software package are not limited.

Figure 3A:
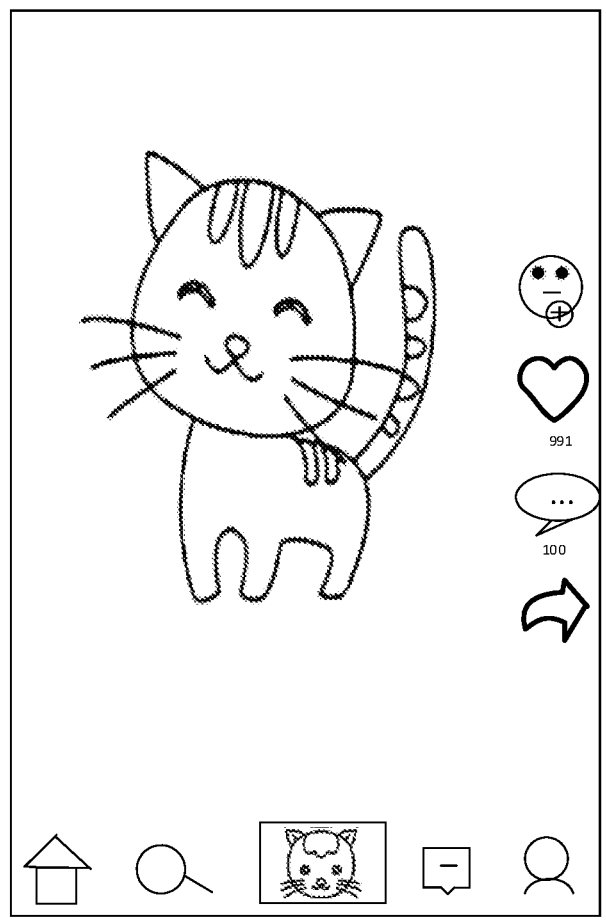
FIG. 3A is a schematic diagram of a video browsing interface comprising a dynamic picture according to some embodiments of the present disclosure.
Figure 3B:
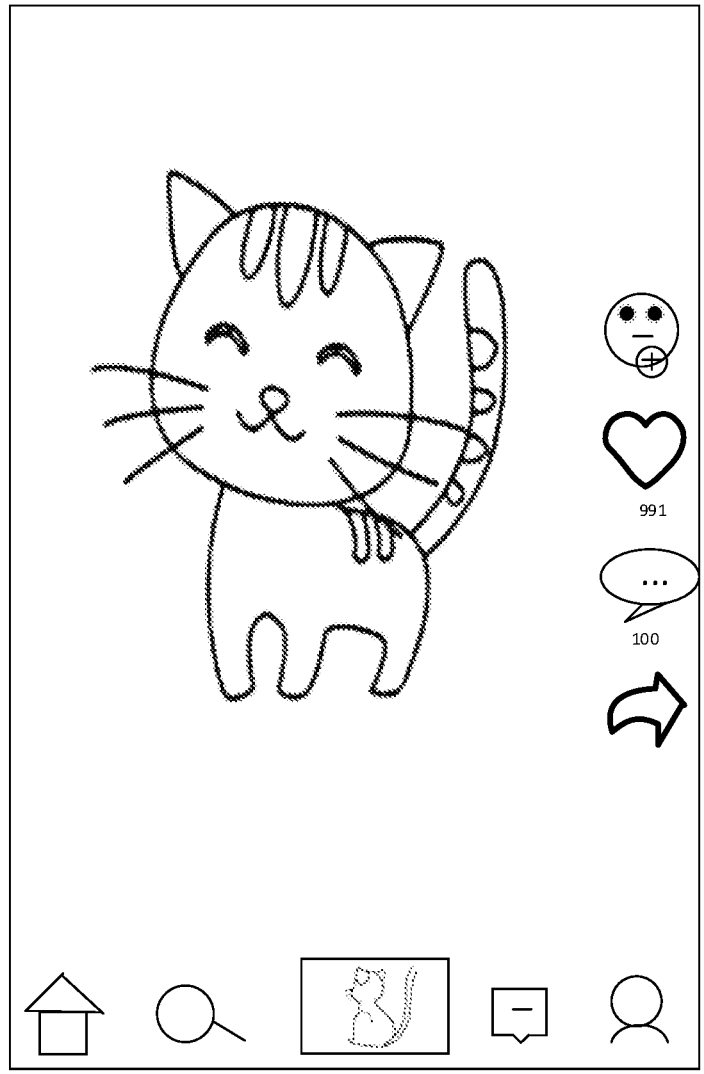
FIG. 3B is a schematic diagram of a video browsing interface comprising a dynamic picture according to some embodiments of the present disclosure.

In a specific implementation, FIGS. 3A and 3B show schematic diagrams of a video browsing interface comprising a dynamic picture provided in some embodiments, where content in the dynamic picture dynamically changes according to an effect of the software package, for example, when browsing and viewing a video related to a cat on the browsing interface comprising the shooting button shown in FIG. 2, a user will acquire a pre-made software package related to the cat theme, and the acquired software package is subjected to thumbnail processing to acquire a dynamic picture, wherein the dynamic picture being associated with the software package specifically refers to the dynamic picture corresponding to a preview of the software package. Moreover, as shown in FIGS. 3A and 3B, the content of the dynamic picture that is presented at the position of the area of the shooting button constantly changes, so that the attraction to the user can be enhanced, and in response to determining that the dynamic picture is presented within the area of the shooting button, the software package related to the cat theme is pushed to the user by an trigger operation of the user on the dynamic picture.

In some embodiments, the template selection method further comprises: after the presenting the dynamic picture within the area of the shooting button, in response to determining that the selection instruction of the user has not been received within a specified time range, re-presenting the shooting button within the area.

It should be noted that, in response to determining that the selection instruction of the user for the dynamic picture has not been received within the specified time range, for example, within 30 seconds of presenting the dynamic picture of the software package, it is indicated that the user is not interested in the presented software package, and in order to ensure the video viewing experience effect of the user, the dynamic picture will be cancelled, and accordingly, the shooting button will be re-presented within the area, thereby avoiding excessive interference to the user.

Step S103, in response to a selection instruction of the user on the dynamic picture presented within the area of the shooting button, loading the software package, wherein the software package is configured to generate multimedia content at least based on a multimedia content editing template.

In some embodiments, the template selection method further comprises: in response to loading the software package, presenting the multimedia content editing template, wherein the multimedia content editing template comprises a picture selection element; presenting a picture library of the user in response to a trigger instruction on the picture selection element; and in response to a selection instruction for at least one picture in the picture library, generating, according to the multimedia content editing template, a short video from the at least one picture selected by the user.

Figure 4:
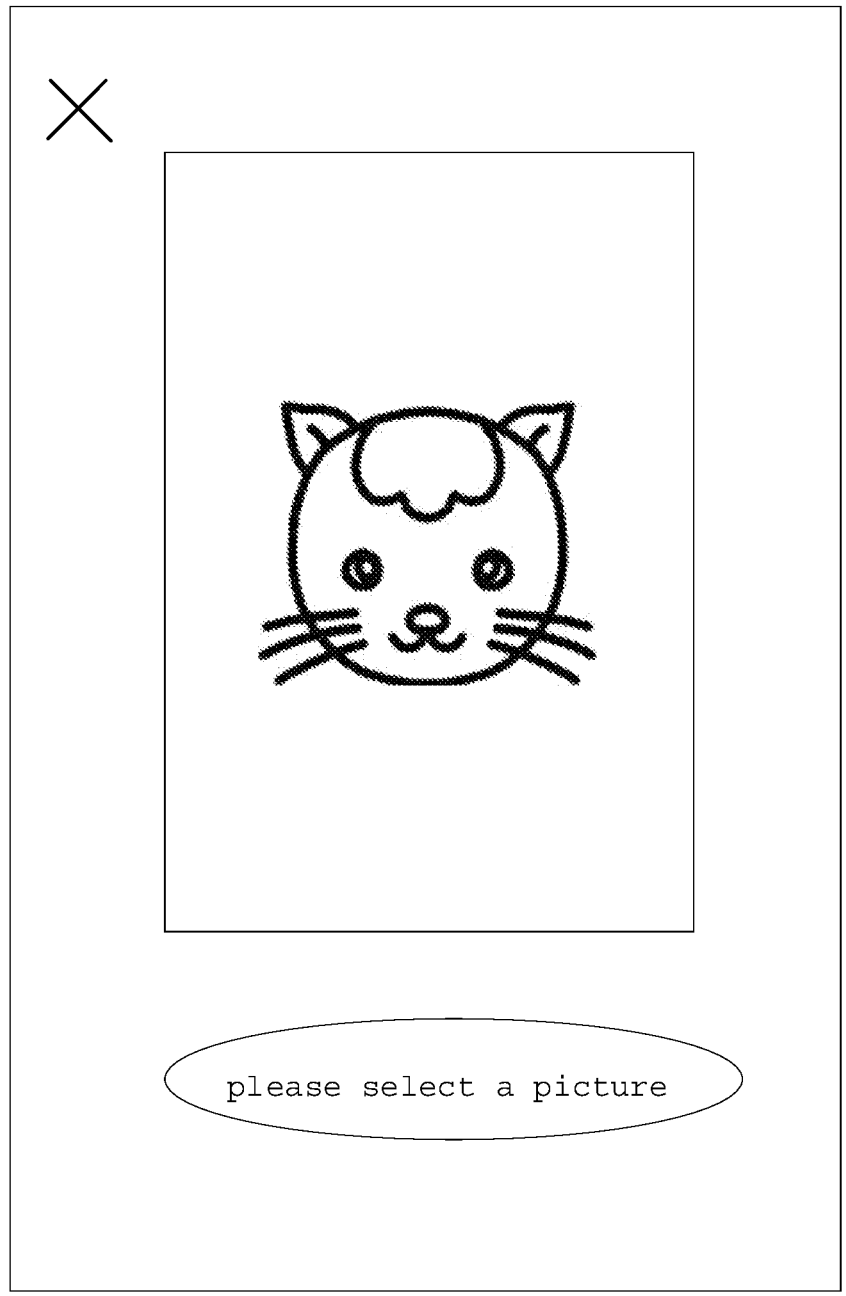
FIG. 4 is a schematic diagram of an interface of an software package according to some embodiments of the present disclosure.

In some embodiments, after the dynamic picture is presented within the area, in response to determining that the user is interested in the presented dynamic picture, the dynamic picture can be selected by means of clicking, and in response to determining that the selection instruction of the user for the dynamic picture has been received, the software package associated with the dynamic picture is presented. For example, FIG. 4 shows a schematic diagram of an interface of an software package, where the presented software package will comprises a picture selection element, such as an identification of "please select a picture" in FIG. 4, and of course in some embodiments, examples are taken only for illustration and specific identifications corresponding to the picture selection element are not limited. in response to determining that the trigger instruction of the user for the picture selection element has been received, a picture library previously shot or downloaded by the user will be presented, and since what the dynamic picture is associated with is the software package related to the cat theme, the user can select a previously shot picture related to a cat from the presented picture library, and according to the picture selected by the user, generate a short video in accordance with a playing special effect of the software package, so that the short video work with higher quality can be acquired without the need of video edit processing performed by the user, thereby improving the efficiency of making the short video.

In some embodiments of the present disclosure, in response to determining that the specified preset condition is met, the dynamic picture of the software package is presented within the area of the shooting button, for the user to directly load the software package by triggering the dynamic picture, without the need of screening from numerous software packages, thereby improving the efficiency of software package selection and improving the user experience effect.

Figure 5:
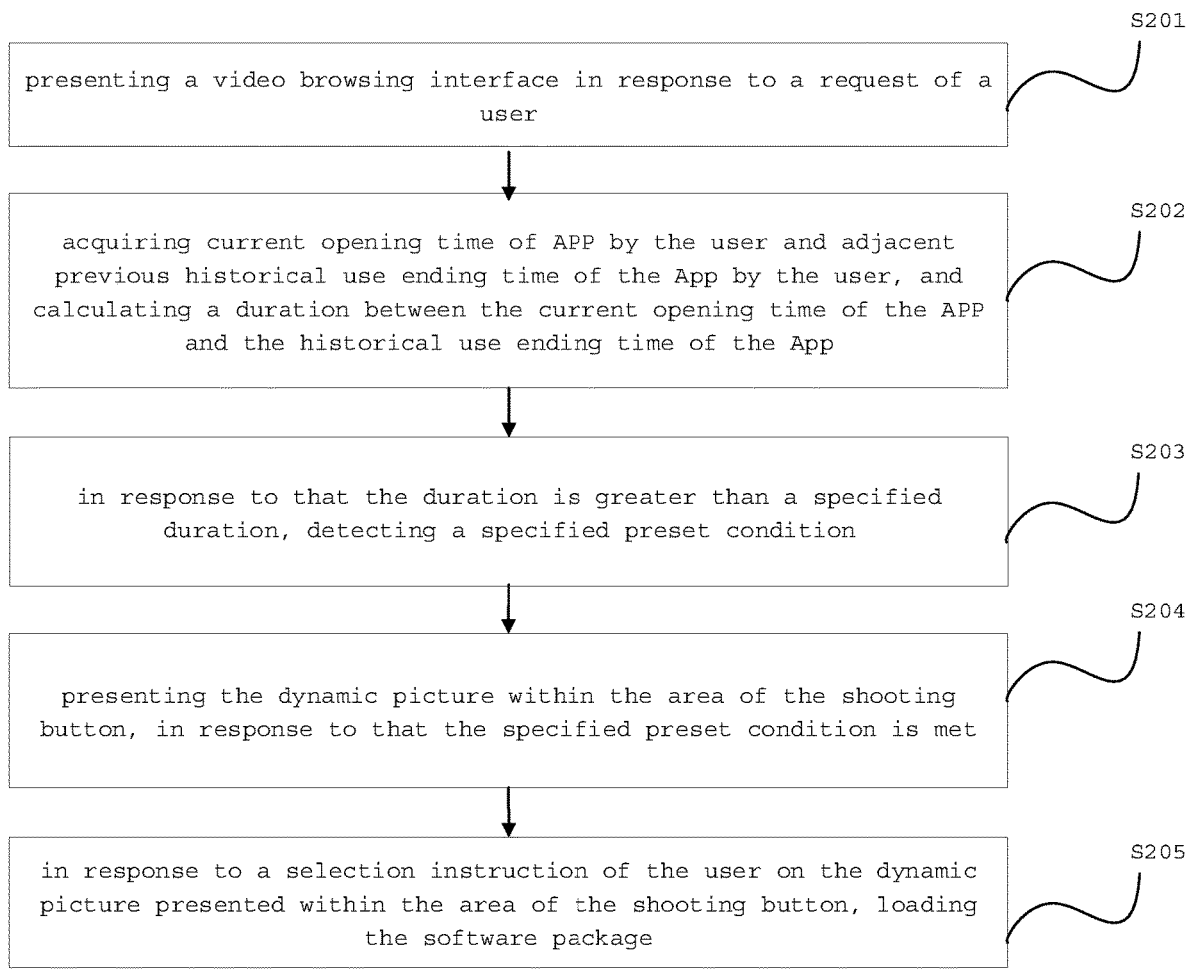
FIG. 5 is a flow diagram of a template selection method according to some embodiments of the present disclosure.

FIG. 5 is a flow diagram of a template selection method provided in some embodiments of the present disclosure, and some embodiments of the present disclosure can be combined with various optional solutions in the above embodiments, and in some embodiments of the present disclosure, before the step of "presenting the dynamic picture of the software package within the area of the shooting button when a specified preset condition is met" is performed, the determination of a specific limitation condition is added, so that the template selection method specifically comprises:

step S201, presenting a video browsing interface in response to a request of a user, wherein the video browsing interface comprises a shooting button;

step S202, acquiring current opening time of APP by the user and adjacent previous historical use ending time of the App by the user, and calculating a duration between the current opening time of the APP and the historical use ending time of the App.

In some embodiments, the current opening time of APP by the user and the adjacent previous historical use ending time of the App by the user will be acquired, for example, the current opening time of the APP is 6 pm, and the adjacent previous login the APP use ending time is 1 pm on a same day, then a duration between the two times is calculated specifically as 5 hours.

Step S203, in response to determining that the duration is greater than a specified duration, detecting a specified preset condition.

In some embodiments, a cooling mechanism can be set to avoid excessive interference of the dynamic picture to the user, and the principle of the cooling mechanism means that, by presetting the specified duration, in response to determining that the duration between the two times is less than the specified duration, the dynamic picture is not presented to the user when the APP is opened for a second time by the user; and in response to determining that the duration between the two times is greater than the specified duration, the dynamic picture is presented to the user when the APP is opened for the second time by the user.

It should be noted that, because it can be preset in some embodiments that the user has only one trigger opportunity for the dynamic picture, in response to determining that the dynamic picture of the software package is presented within the area of the shooting button, it is required to determine that the duration is greater than the specified duration, and to determine that the user did not select the dynamic picture when previously using the APP.

Step S204, presenting the dynamic picture within the area of the shooting button, in response to determining that the specified preset condition is met.

In some embodiment, the dynamic picture is a preview of the multimedia content editing template, and in some embodiments, the dynamic picture can specifically be a preview acquired according to thumbnail processing of the software package.

In some embodiment, the specified preset condition comprises: a browsing duration of the user for the video browsing interface reaching a preset duration; or a browsing content of the user on the video browsing interface comprising a video of a specified type; or an operation behavior of the user for the browsing content on the video browsing interface meeting a preset condition.

In some embodiments, the template selection method further comprises: after the presenting the dynamic picture within the area of the shooting button, in response to determining that the selection instruction of the user has not been received within a specified time range, re-presenting the shooting button within the area.

Step S205, in response to a selection instruction of the user on the dynamic picture presented within the area of the shooting button, loading the software package, wherein the software package is configured to generate multimedia content at least based on a multimedia content editing template.

In some embodiments, the template selection method further comprises: in response to loading the software package, presenting the multimedia content editing template, wherein the multimedia content editing template comprises a picture selection element; presenting a picture library of the user in response to a trigger instruction on the picture selection element; and in response to a selection instruction for at least one picture in the picture library, generating, according to the multimedia content editing template, a short video from the at least one picture selected by the user.

In some embodiments of the present disclosure, in response to determining that the specified preset condition is met, the dynamic picture of the software package is presented within the area of the shooting button, for the user to directly load the software package by triggering the dynamic picture, without the need of screening from numerous software packages, thereby improving the efficiency of the software package selection and improving the user experience effect.

Figure 6:
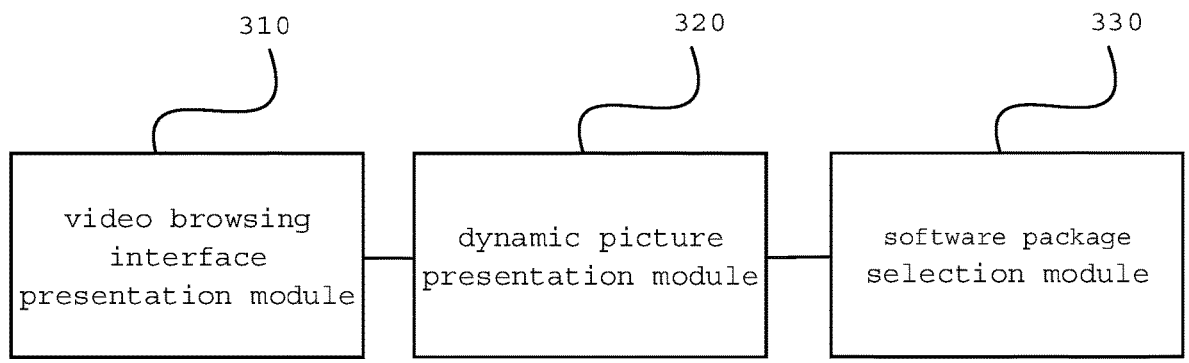
FIG. 6 is a schematic structural diagram of a template selection apparatus according to some embodiments of the present disclosure.

FIG. 6 is a schematic structural diagram of a template selection apparatus provided in some embodiments of the present disclosure. The apparatus can be implemented by software and/or hardware and can generally be integrated in an electronic device performing the template selection method. As shown in FIG. 6, the apparatus can comprise: a video browsing interface presentation module 310, a dynamic picture presentation module 320 and an software package selection module 330.

The video browsing interface presentation module 310 is configured to present a video browsing interface in response to a request of a user, wherein the video browsing interface comprises a shooting button;

the dynamic picture presentation module 320 is configured to present a dynamic picture within an area of the shooting button in response to determining that a specified preset condition is met, wherein the dynamic picture is associated with a software package; and the software package selection module 330 is configured to load the software package in response to a selection instruction of the user for the dynamic picture presented within the area of the shooting button.

In some embodiments, on the basis of the above technical solution, the dynamic picture is a preview of the multimedia content editing template.

In some embodiments, on the basis of the above technical solution, the dynamic picture is a preview acquired according to thumbnail processing of the multimedia content editing template.

In some embodiments, on the basis of the above technical solution, the apparatus further comprises a disappearance module configured to re-present the shooting button within the area in response to determining that it is determined that the selection instruction of the user has not been received within a specified time range.

In some embodiments, on the basis of the above technical solution, the apparatus further comprises a dynamic picture presentation determination module configured to acquire the current opening time of the APP by the user and the adjacent previous historical use ending time of the APP by the user, and calculate a duration between the current opening time of the APP and the historical use ending time of the App; and in response to determining that the duration is greater than a specified duration, detect the specified preset condition.

In some embodiments, on the basis of the above technical solution, the apparatus further comprises a short video generation module specifically configured to:

present the software package, wherein the software package comprises a picture selection element;

present a picture library of the user in response to a trigger instruction of the user for the picture selection element; and in response to a selection instruction of the user for a picture in the picture library, generate, according to the multimedia content editing template, a short video from the picture selected by the user.

In some embodiments, on the basis of the above technical solution, the specified preset condition comprises: a browsing duration of the user for the video browsing interface reaching a preset duration, or;

a browsing content of the user on the video browsing interface comprising a video of a specified type, or;

an operation behavior of the user for the browsing content on the video browsing interface meeting a preset condition.

In some embodiments of the present disclosure, in response to determining that the specified preset condition is met, the dynamic picture of the software package is presented within the area of the shooting button, for the user to directly load the software package by triggering the dynamic picture, without the need of screening from numerous software packages, thereby improving the efficiency of software package selection and improving the user experience effect.

Figure 7:
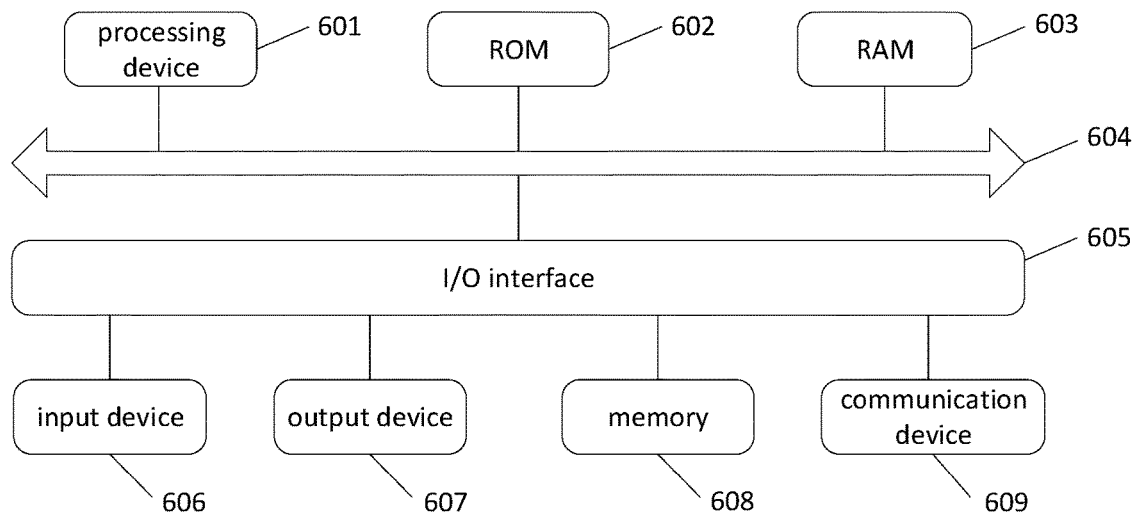
FIG. 7 is a schematic structural diagram of an electronic device according to some embodiments of the present disclosure.

Referring now to FIG. 7, there is shown a schematic structural diagram suitable for implementing an electronic device 600 in some embodiments of the present disclosure. The electronic device in some embodiments of the present disclosure can be a device of a backend service platform of an application, and can also be a mobile terminal device having installed thereon an application client. In some embodiments, the electronic device can include, but is not limited to, a mobile terminal such as a mobile phone, a notebook computer, a digital broadcast receiver, a PDA (Personal Digital Assistant), a PAD (tablet computer), a PMP (Portable Multimedia Player), a vehicle-mounted terminal (for example, a vehicle-mounted navigation terminal), and the like, and a fixed terminal such as a digital TV, a desktop computer, and the like. The electronic device shown in FIG. 7 is only an example, and should not bring any limitation to the function and the use scope of the embodiments of the present disclosure.

As shown in FIG. 7, the electronic device 600 can comprise a processing device (for example, central processing unit, graphics processor, etc.) 601 that can perform various appropriate acts and processing according to a program stored in a read-only memory (ROM) 602 or a program loaded from a memory 608 into a random access memory (RAM) 603. In the RAM 603, various programs and data required for operations of the electronic device 600 are also stored. The processing device 601, the ROM 602, and the RAM 603 are connected to each other through a bus 604. An input/output (I/O) interface 605 is also connected to the bus 604.

Generally, the following devices can be connected to the I/O interface 605: an input device 606 comprising, for example, a touch screen, touch pad, keyboard, mouse, camera, microphone, accelerometer, gyroscope, and the like; an output device 607 comprising, for example, a liquid crystal display (LCD), speaker, vibrator, and the like; a memory 608 comprising, for example, a magnetic tape, hard disk, and the like; and a communication device 609. The communication means 609 can allow the electronic device 600 to be in wireless or wired communication with another device to exchange data. While FIG. 7 shows the electronic device 600 provided with various devices, it should be understood that it is not required that all devices shown be implemented or provided with. More or less devices can be alternatively implemented or provided.

Particularly, the process described above with reference to the flow diagram can be implemented as a computer software program according to the embodiments of the present disclosure. For example, an embodiment of the present disclosure comprises a computer program product comprising a computer program carried on a non-transitory computer-readable medium, the computer program comprising program code for performing the template selection method illustrated by the flow diagram. In such an embodiment, the computer program can be downloaded and installed from a network through the communication device 609, or installed from the memory 608, or installed from the ROM 602. The computer program, when executed by the processing device 601, performs the above function defined in the template selection method of the embodiment of the present disclosure.

It should be noted that the above non-transitory computer-readable storage medium of the present disclosure can be a non-transitory computer-readable signal medium or a non-transitory computer-readable storage medium or any combination of the two. The non-transitory computer-readable storage medium can be, for example, but is not limited to, an electronic, magnetic, optical, electromagnetic, infrared, or semiconductor system, apparatus, or device, or any combination of the above. More specific examples of the non-transitory computer-readable storage medium can include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the non-transitory computer-readable storage medium can be any tangible medium that can have thereon contained or stored a program, wherein the program can be used by or in conjunction with an instruction execution system, apparatus, or device. However, in the present disclosure, the non-transitory computer-readable signal medium can comprise a data signal propagated in baseband or as part of a carrier wave, in which computer-readable program code is carried. Such a propagated data signal can take any of a variety of forms, including but not limited to, an electro-magnetic signal, an optical signal, or any suitable combination of the above. The non-transitory computer-readable signal medium can be any non-transitory computer-readable medium other than the non-transitory computer-readable storage medium, wherein the non-transitory computer-readable signal medium can send, propagate, or transmit a program that is used by or in conjunction with an instruction execution system, apparatus, or device. Program code contained on the non-transitory computer-readable medium can be transmitted using any appropriate medium, including but not limited to: an wire, optical cable, RF (radio frequency), etc., or any suitable combination of the above.

In some embodiments, the client and server can communicate using any currently known or future developed network protocol, such as HTTP (HyperText Transfer Protocol), and can be interconnected with any form or medium of digital data communication (for example, a communication network). An example of the communication network comprises a local area network ("LAN"), a wide area network ("WAN"), an internet (for example, the Internet), and a peer-to-peer network (for example, ad hoc peer-to-peer network), as well as any currently known or future developed network.

The above non-transitory computer-readable medium can be contained in the above electronic device; and can also exist alone and not be assembled into the electronic device.

The above non-transitory computer-readable medium has carried one or more programs, which when executed by the electronic device, cause an internal process of the electronic device to perform: presenting a video browsing interface in response to a request of a user, wherein the video browsing interface comprises a shooting button; presenting a dynamic picture of an software package within an area of the shooting button in response to determining that a specified preset condition is met, wherein the dynamic picture is associated with the software package; and in response to determining that the dynamic picture is presented within the area of the shooting button, in response to a selection instruction of the user for the dynamic picture, loading the software package.

Computer program code for performing the operation of the present disclosure can be written in one or more programming languages or a combination thereof, wherein the programming language includes but is not limited to an object-oriented programming language such as Smalltalk, C++, and also comprises a conventional procedural programming language, such as the "C" programming language or a similar programming language. The program code can be executed entirely on a user's computer, partly on the user's computer, as a stand-alone software package, partly on the user's computer and partly on a remote computer or entirely on the remote computer or server. In a scenario where the remote computer is involved, the remote computer can be connected to the user's computer through any type of network, comprising a local area network (LAN) or a wide area network (WAN), or can be connected to an external computer (for example, through the Internet using an Internet service provider).

The flow diagrams and block diagrams in the accompanying drawings illustrate the possibly implemented architecture, functionality, and operation of the systems, methods and computer program products according to various embodiments of the present disclosure. In this regard, each block in the flow diagrams or block diagrams can represent one module, program segment, or portion of code, which contains one or more executable instructions for implementing the specified logical function. It should also be noted that, in some alternative implementations, the functions noted in the blocks can occur out of the order noted in the drawings. For example, two blocks shown in succession can, in fact, be executed substantially concurrently, or the blocks can sometimes be executed in reverse order, depending upon the functionality involved. It will also be noted that each block in the block diagrams and/or flow diagrams, and a combination of blocks in the block diagrams and/or flow diagrams, can be implemented by a special-purpose hardware-based system that perform the specified functions or operations, or a combination of special-purpose hardware and computer instructions.

The involved unit described in some embodiments of the present disclosure can be implemented by software or hardware. The name of the unit does not in some cases constitute a limitation on the unit itself.

The functions described above herein can be performed, at least in part, by one or more hardware logic components. For example, without limitation, an exemplary type of hardware logic components that can be used comprises: a field programmable gate array (FPGA), application specific integrated circuit (ASIC), application specific standard product (ASSP), system on chip (SOC), complex programmable logic device (CPLD), and the like.

In the context of this disclosure, a machine-readable medium can be a tangible medium that can have contained or stored a program for use by or in conjunction with an instruction execution system, apparatus, or device. The machine-readable medium can be a machine-readable signal medium or a machine-readable storage medium. The machine-readable medium can include, but is not limited to, an electronic, magnetic, optical, electromagnetic, infrared, or semiconductor system, apparatus, or device, or any suitable combination of the above. More specific examples of the machine-readable storage medium would comprise an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above.

The above description is only the preferred embodiments of the present disclosure and is illustrative of the applied technical principles. It should be appreciated by those skilled in the art that the disclosure scope involved in this disclosure is not limited to the technical solution formed by the specific combination of the above technical features, and should also encompass other technical solutions formed by an arbitrary combination of the above technical features or their equivalent features without departing from the above disclosed concepts. For example, it is a technical solution formed by replacing the above features with technical features having functions similar to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing can be advantageous. Similarly, while several specific implementation details are contained in the above discussion, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or method logic acts, it should be understood that the subject matter defined in the attached claims is not necessarily limited to the specific features or acts described above. On the contrary, the specific features and acts described above are only exemplary forms in which the claims are implemented.

What is claimed is:

1. A template selection method, comprising:
    presenting a video browsing interface in response to a request of a user, wherein the video browsing interface comprises a shooting button;
    presenting a dynamic picture within an area of the shooting button in response to determining that a specified preset condition is met, wherein the dynamic picture is associated with a software package; and
    in response to a selection instruction of the user on the dynamic picture presented within the area of the shooting button, loading the software package,
    wherein the software package is configured to generate multimedia content at least based on a multimedia content editing template.

2. The template selection method according to claim 1, wherein the dynamic picture is a preview of the multimedia content editing template.

3. The template selection method according to claim 2, wherein the dynamic picture is a preview acquired according to thumbnail processing of the multimedia content editing template.

4. The template selection method according to claim 1, further comprising:
    after the presenting the dynamic picture within the area of the shooting button, in response to determining that the selection instruction of the user has not been received within a specified time range, re-presenting the shooting button within the area.

5. The template selection method according to claim 4, further comprising:
    before the presenting the dynamic picture within the area of the shooting button, acquiring current opening time of APP by the user and adjacent previous historical use ending time of the App by the user, and calculating a duration between the current opening time of the App and the historical use ending time of the App; and
    in response to determining that the duration is greater than a specified duration, detecting a specified preset condition.

6. The template selection method according to claim 1, further comprising:
    in response to loading the software package, presenting the multimedia content editing template, wherein the multimedia content editing template comprises a picture selection element;

presenting a picture library of the user in response to a trigger instruction on the picture selection element; and in response to a selection instruction for at least one picture in the picture library, generating, according to the multimedia content editing template, a short video from the at least one picture selected by the user.

7. The template selection method according to claim 1, wherein the specified preset condition comprises:

a browsing duration of the user for the video browsing interface reaching a preset duration; or a browsing content of the user on the video browsing interface comprising a video of a specified type; or an operation behavior of the user for the browsing content on the video browsing interface meeting a preset condition.

8. An electronic device, comprising:

one or more processors; and a memory configured to store one or more programs, wherein the one or more programs, when executed by the one or more processors, cause the one or more processors to implement a template selection method comprising:

presenting a video browsing interface in response to a request of a user, wherein the video browsing interface comprises a shooting button;

presenting a dynamic picture within an area of the shooting button in response to determining that a specified preset condition is met, wherein the dynamic picture is associated with a software package; and in response to determining a selection instruction of the user on the dynamic picture presented within the area of the shooting button, loading the software package, wherein the software package is configured to generate multimedia content at least based on a multimedia content editing template.

9. The electronic device according to claim 8, wherein the dynamic picture is a preview of the multimedia content editing template.

10. The electronic device according to claim 8, wherein the dynamic picture is a preview acquired according to thumbnail processing of the multimedia content editing template.

11. The electronic device according to claim 8, wherein the one or more processors are configured to:

after the presenting the dynamic picture within the area of the shooting button, in response to determining that the selection instruction of the user has not been received within a specified time range, re-presenting the shooting button within the area.

12. The electronic device according to claim 8, wherein the one or more processors are configured to:

before the presenting the dynamic picture within the area of the shooting button, acquiring current opening time of APP by the user and adjacent previous historical use ending time of the App by the user, and calculating a duration between the current opening time of the App and the historical use ending time of the App; and in response to determining that the duration is greater than a specified duration, detecting a specified preset condition.

13. The electronic device according to claim 8, wherein the one or more processors are configured to:

in response to loading the software package, presenting the multimedia content editing template, wherein the multimedia content editing template comprises a picture selection element;

presenting a picture library of the user in response to a trigger instruction on the picture selection element; and in response to a selection instruction for at least one picture in the picture library, generating, according to the multimedia content editing template, a short video from the at least one picture selected by the user.

14. A non-transitory computer-readable storage medium having stored thereon a computer program, wherein the program, when executed by a processor, implements a template selection method comprising:

presenting a video browsing interface in response to a request of a user, wherein the video browsing interface comprises a shooting button;

presenting a dynamic picture within an area of the shooting button in response to determining that a specified preset condition is met, wherein the dynamic picture is associated with a software package; and in response to a selection instruction of the user on the dynamic picture presented within the area of the shooting button, loading the software package, wherein the software package is configured to generate multimedia content at least based on a multimedia content editing template.

15. The non-transitory computer-readable storage medium according to claim 14, wherein the dynamic picture is a preview of the multimedia content editing template.

16. The non-transitory computer-readable storage medium according to claim 14, wherein the dynamic picture is a preview acquired according to thumbnail processing of the multimedia content editing template.

17. The non-transitory computer-readable storage medium according to claim 14, wherein the program, when executed by a processor, implements a template selection method further comprising:

after the presenting the dynamic picture within the area of the shooting button, in response to determining that the selection instruction of the user has not been received within a specified time range, re-presenting the shooting button within the area.

18. The non-transitory computer-readable storage medium according to claim 14, wherein the program, when executed by a processor, implements a template selection method further comprising:

before the presenting the dynamic picture within the area of the shooting button, acquiring current opening time of APP by the user and adjacent previous historical use ending time of the App by the user, and calculating a duration between the current opening time of the App and the historical use ending time of the App; and in response to determining that the duration is greater than a specified duration, detecting a specified preset condition.

19. The non-transitory computer-readable storage medium according to claim 14, wherein the program, when executed by a processor, implements a template selection method further comprising:

in response to loading the software package, presenting the multimedia content editing template, wherein the multimedia content editing template comprises a picture selection element;

presenting a picture library of the user in response to a trigger instruction on the picture selection element; and in response to a selection instruction for at least one picture in the picture library, generating, according to the multimedia content editing template, a short video from the at least one picture selected by the user.

20. The non-transitory computer-readable storage medium according to claim 14, wherein the specified preset condition comprises:
- a browsing duration of the user for the video browsing interface reaching a preset duration; or
- a browsing content of the user on the video browsing interface comprising a video of a specified type; or
- an operation behavior of the user for the browsing content on the video browsing interface meeting a preset condition.

* * * * *